Aug. 10, 1954  R. M. BRINK ET AL  2,685,960
MEASURING DEVICE OR THE LIKE FOR TEXTILE MATERIALS
Filed March 4, 1950  4 Sheets-Sheet 1

INVENTORS
ROBERT M. BRINK
KENNETH J. CHICHESTER
BY
Louise E. Norton
ATTORNEY

Aug. 10, 1954    R. M. BRINK ET AL    2,685,960
MEASURING DEVICE OR THE LIKE FOR TEXTILE MATERIALS
Filed March 4, 1950    4 Sheets-Sheet 2

INVENTORS
ROBERT M. BRINK
KENNETH J. CHICHESTER
BY
Louise E. Norton
ATTORNEY

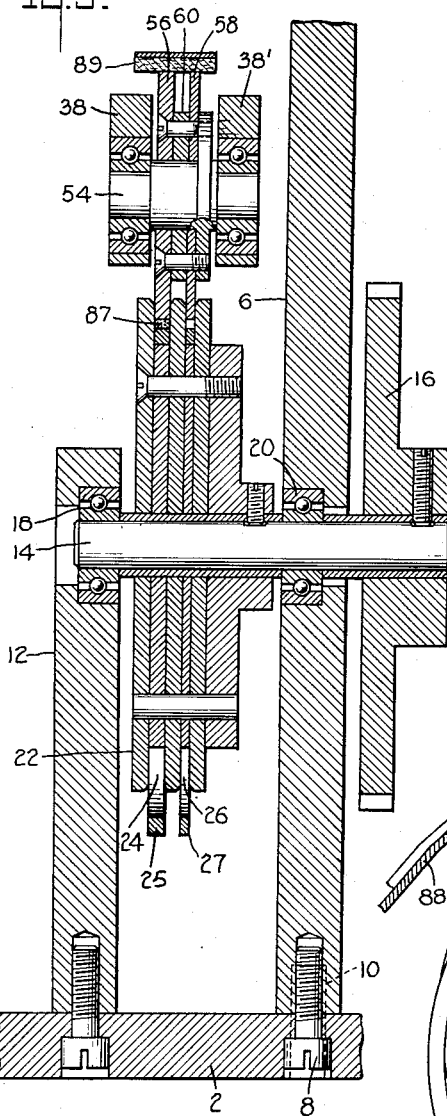
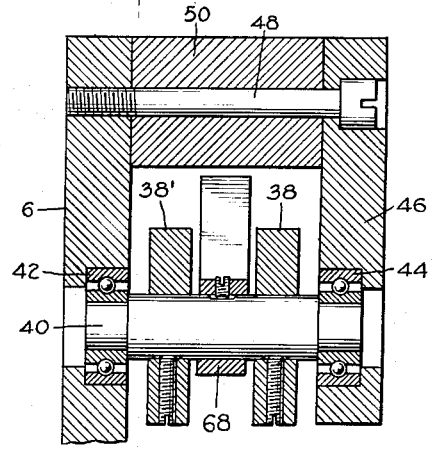
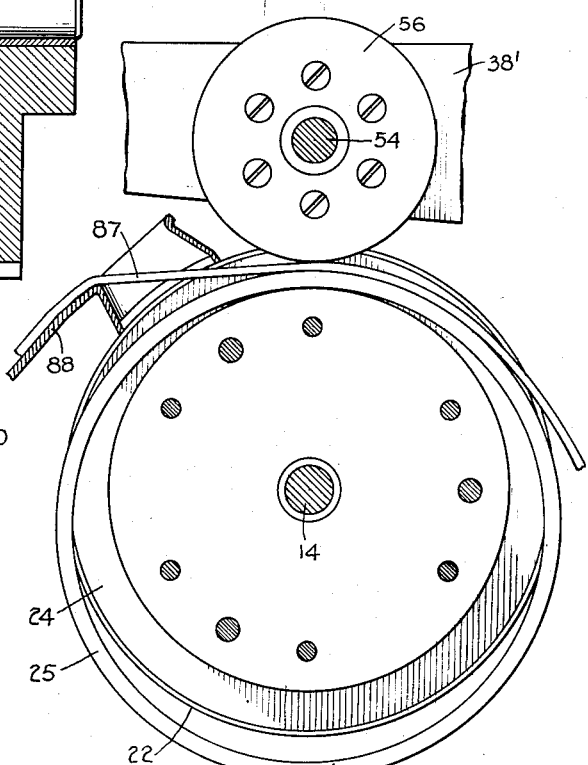
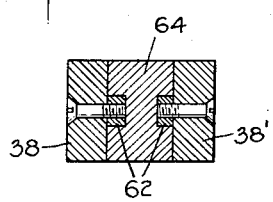

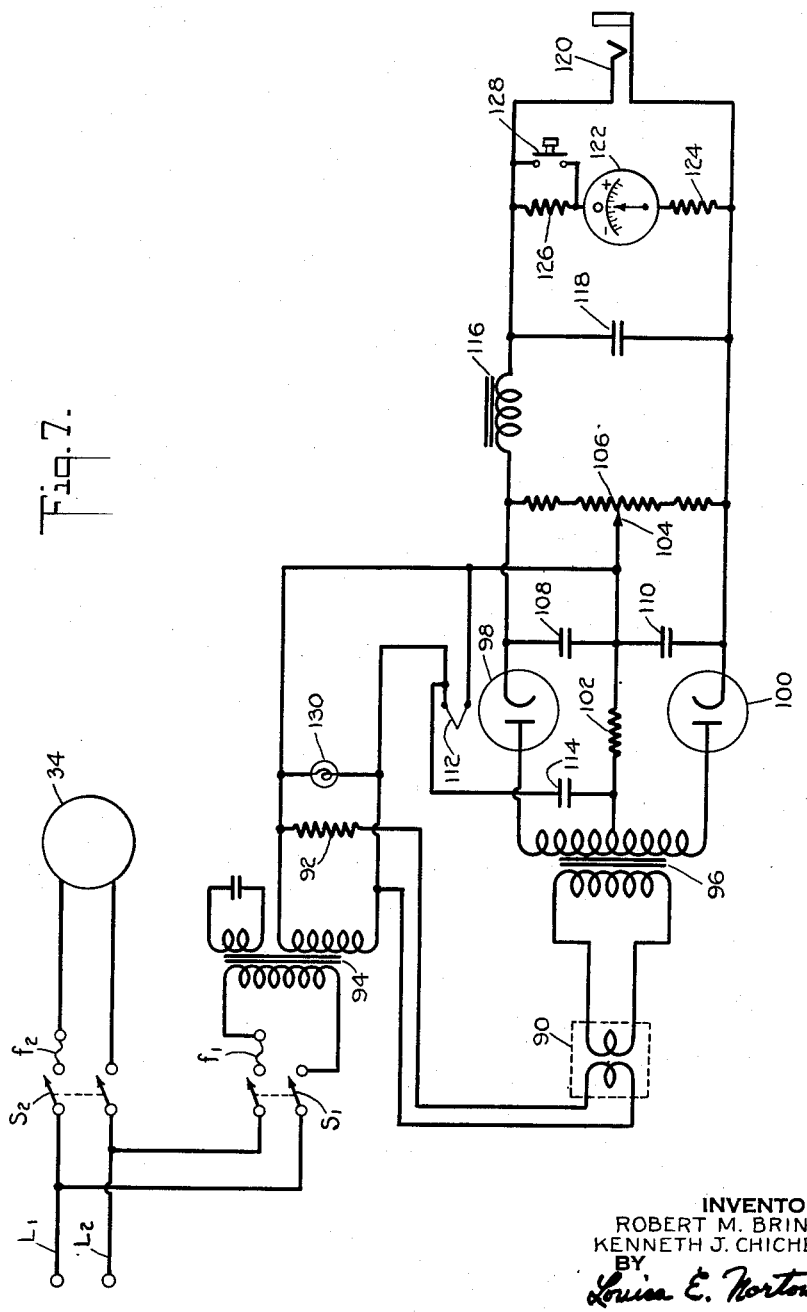

Patented Aug. 10, 1954

2,685,960

UNITED STATES PATENT OFFICE 2,685,960

MEASURING DEVICE OR THE LIKE FOR TEXTILE MATERIALS

Robert M. Brink, Stamford, Conn., and Kenneth J. Chichester, Flushing, N. Y., assignors to Deering Milliken Research Trust, Greenwich, Conn., a nonprofit trust of Maine Application March 4, 1950, Serial No. 147,726

2 Claims. (Cl. 203—220)

The present invention relates to textile measuring devices, and more particularly to devices for measuring and recording the thickness of textile strands, and comprises a novel improved device of this character which is adapted to yield a continuous reproducible and amplified record of the thickness of either roving or sliver during travel of a strand therethrough. The new device is simple of construction, economical to manufacture, sensitive and accurate in operation.

A feature of the invention is the means whereby mechanical movements of a feeler engaging the strand to be measured and responsive to thickness variations are amplified and converted to changes in an electrical current or voltage for convenient application, after further amplification, to a meter and recorder.

A further feature of the invention is the means for preventing clinging of the textile strand to the device and thereby insuring against damage to the strand, clogging of the device, and inaccurate measurement of succeeding lengths of the strand.

Another feature of the invention is the electronic circuit which is phase sensitive and permits of zero setting of the meter and recorder.

Other features of the invention will become apparent as the description proceeds.

Briefly, the new textile strand measuring device, or analyzer, comprises a driven roll which has one or more peripheral grooves for reception of the strand to be measured and which advances the strand at a uniform rate, a weighted idler feeler roll, the periphery of which rests upon a strand in a groove of the driven roll, and which is so supported on a pivoted lever arm as to cause angular movement of the arm in accordance with variations in the depth of the strand in the groove of the driven roll and a selsyn motor, the shaft of which is coupled to the lever arm for rotation upon angular displacement of the arm about its pivot and the stator coil of which is connected in a phase sensitive amplifying circuit including a meter and recorder. Preferably the driven roll has two peripheral grooves, one dimensioned for reception of sliver and one for roving. A shallow ring having an inside diameter substantially greater than the diameter of the driven roll at the base of a groove and fitted to the sides of the groove is carried in each groove. The textile strand is drawn in on top of this idler ring and moves along with it at the same speed. Since the idler ring is larger in diameter than the groove in which it rides and is held in the groove at the top by the weighted idler roll, it separates from the groove at the outlet side and thus lifts the strand from the groove and brings the strand into position to be carried forward and downward by gravity. In the preferred embodiment of the invention the movable lever arm is coupled to the selsyn shaft by an anti-back lash device, hereinafter described, and means are provided for adjusting the rotational position of the shaft of the selsyn independently of the lever arm.

For a better understanding of the invention and of the advantages thereof, reference may be had to the accompanying drawings of which:

Fig. 3 is a vertical sectional view taken on the line 3—3 of Fig. 1;

Fig. 4 is a detail view, on an enlarged scale, of the driven grooved roll and idler rings of the analyzer of Figs. 1 to 3;

Fig. 5 is a detail sectional view taken on line 5—5 of Fig. 1;

Fig. 6 is a section of the lever arm, taken on line 6—6 of Fig. 1; and

Fig. 7 is a diagram of the electronic circuit of the analyzer.

Figure 1:
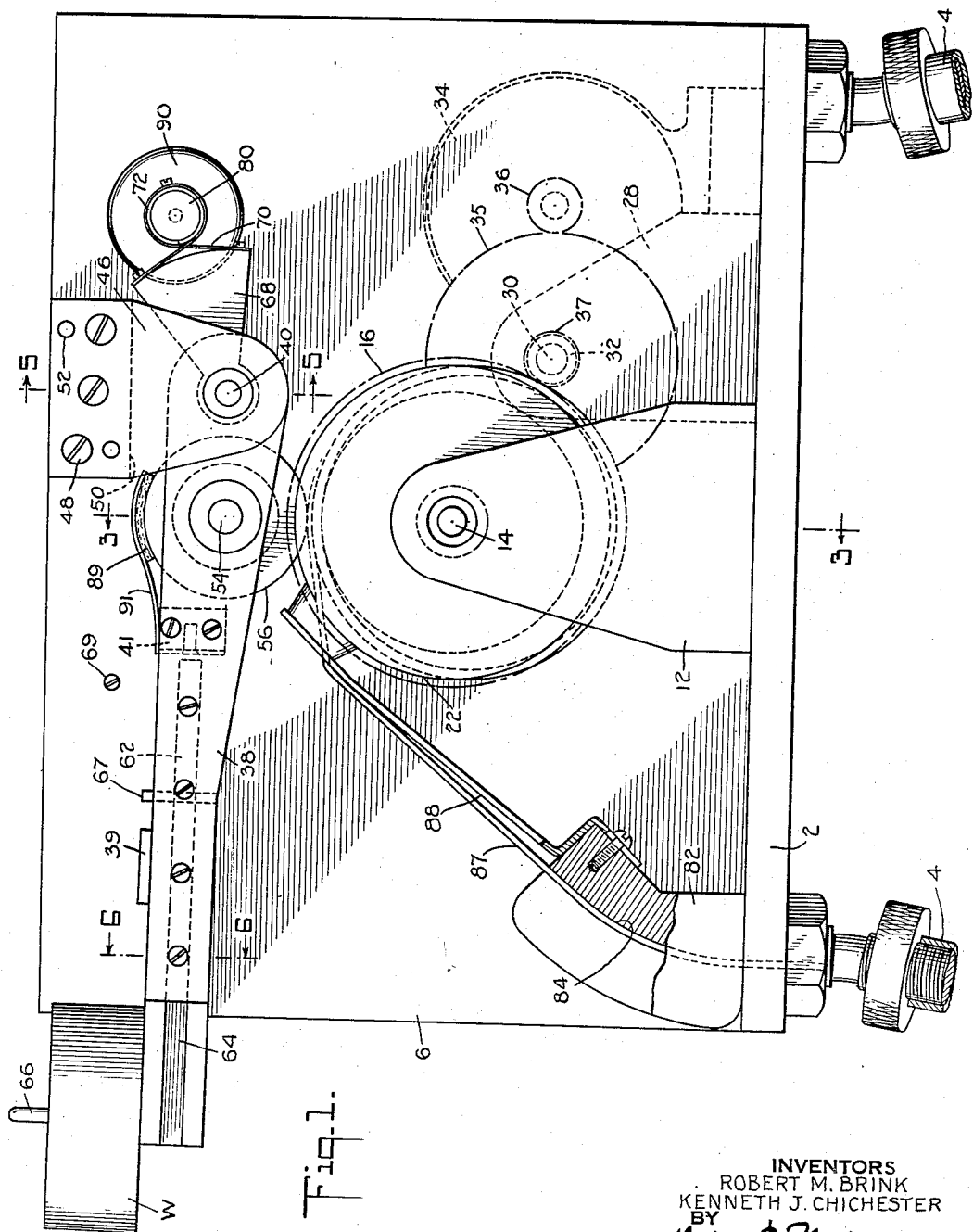
Figs. 1 and 2 are front and top plan views respectively of a textile strand analyzer embodying the invention, parts being broken away for clarity.

As shown in the drawings, the elements of the new analyzer are carried on a base plate 2 which is supported on legs 4, the height of which may be individually adjusted. A vertical bearing plate 6 is mounted on the base plate 2 by any suitable means, such as screws 8 and dowel pins 10 and a bearing block 12 is suitably mounted on the base plate 2 in spaced relation to the plate 6. A shaft 14 carrying a drive gear 16 at its rear end is journalled in bearings 18 and 20, mounted respectively in bearing block 12 and plate 6. Fixedly mounted on the shaft 14 between the plate 6 and block 12 is a roller 22 having annular grooves 24 and 26 in the periphery thereof. (See Fig. 3.) Groove 24, which is substantially wider than groove 26, accommodates relatively heavy sliver whereas groove 26 is proportioned for accommodation of roving. An oversize ring 25 of a radial thickness substantially less than the depth of the groove 24 and of a width substantially equal to the width thereof is loosely carried in this groove. Similarly, an oversize ring 27 of a radial thickness less than the depth of groove 26 is carried in that groove.

A second bearing block 28 is mounted on the base 2 on the side of the plate 6 remote from block 12 and a shaft 30 is journalled in bearings 32 and 33 mounted, respectively, in plate 6 and block 28. Shaft 30 is driven by a motor 34 through a gear 35 fixed to the shaft and meshing with a pinion gear 36 on the motor shaft. Shaft 14 carrying the pulley 22 is driven from shaft 30 by means of a pinion 37 on shaft 30 which meshes with gear 16.

A lever arm comprising two spaced elements 38 and 38' interconnected by spacer blocks 39 and 41 is mounted on one end on a shaft 40. The ends of shaft 40 are journalled in bearings 42 and 44 mounted, respectively, in the bearing plate 6 and a bearing block 46. Block 46 is supported from plate 6 by means of long screws 48 and is spaced therefrom by a spacer block 50, suitably drilled for passage of the supporting screws 48 and dowel pins. (See Figs. 1 and 5.) A short shaft 54 is journalled at its end in bearings mounted in the parts 38 and 38' of the lever arm and on this shaft over the roll 22 are fixedly mounted two disks 56 and 58 which are separated by a spacer disk 60. (See Fig. 3.) Disk 56 is of a width to fit snugly within the groove 24 of roll 22 and disk 58 is of a width to fit snugly in the groove 26. Strips 62 are secured along the opposed faces of the elements 38 and 38' and grooved to fit these strips is a slide 64 which is provided at its end with an upstanding peg 66. The peg 66 serves to anchor one or more cylindrical weight W which provide the desired pressure of the disks 56 and 58 on the textile strands carried within the grooves of roll 22. The extent of permissible displacement of the slide 64 is determined by the positions of spacers 39 and 41, and end plate 67 on the slide engaging one or the other of the spacers at the limit of its travel. A pin 69 threaded in plate 6 provides a stop for excess angular motion of the lever.

In order that rotational movement of shaft 40 occasioned by up or down movement of the feeler disks be transmitted to the electronic circuit hereinafter to be described in connection with Fig. 7, an arcuate arm 68 is fixed to the shaft intermediate the ends of the element 38 and 38' of the lever arm. A strip 70 of phosphor bronze or the like is looped about a pulley 72 and fastened at its ends to the peripheral surface of the arm 68 adjacent the ends thereof and at its mid point to the pulley. Pulley 72 is frictionally mounted on an extension 74 of the shaft of a selsyn motor 90, the selsyn motor being mounted in the bearing plate 6 and connected by cable (not shown) to electrical equipment contained within a housing 78 mounted on the base plate 2. The above described arrangement for coupling shaft 40 and the selsyn motor shaft, comprising the arcuate arm 68, strap 70 and pulley 72 insures correspondence between the angular rotations of the two shafts, rotation of shaft 40 through a given angle resulting in rotation of the selsyn motor shaft through a greater angle, and insures also against back lash of the selsyn motor shaft.

In order that the setting of the shaft 74 for zero output can be adjusted independently of the position of the pressure idler comprising the disks 56 and 58, a knob 80 having a knurled surface is fixed on the end of the extension shaft permitting the shaft to be rotated manually against the frictional grip of the pulley 72.

Figure 2:
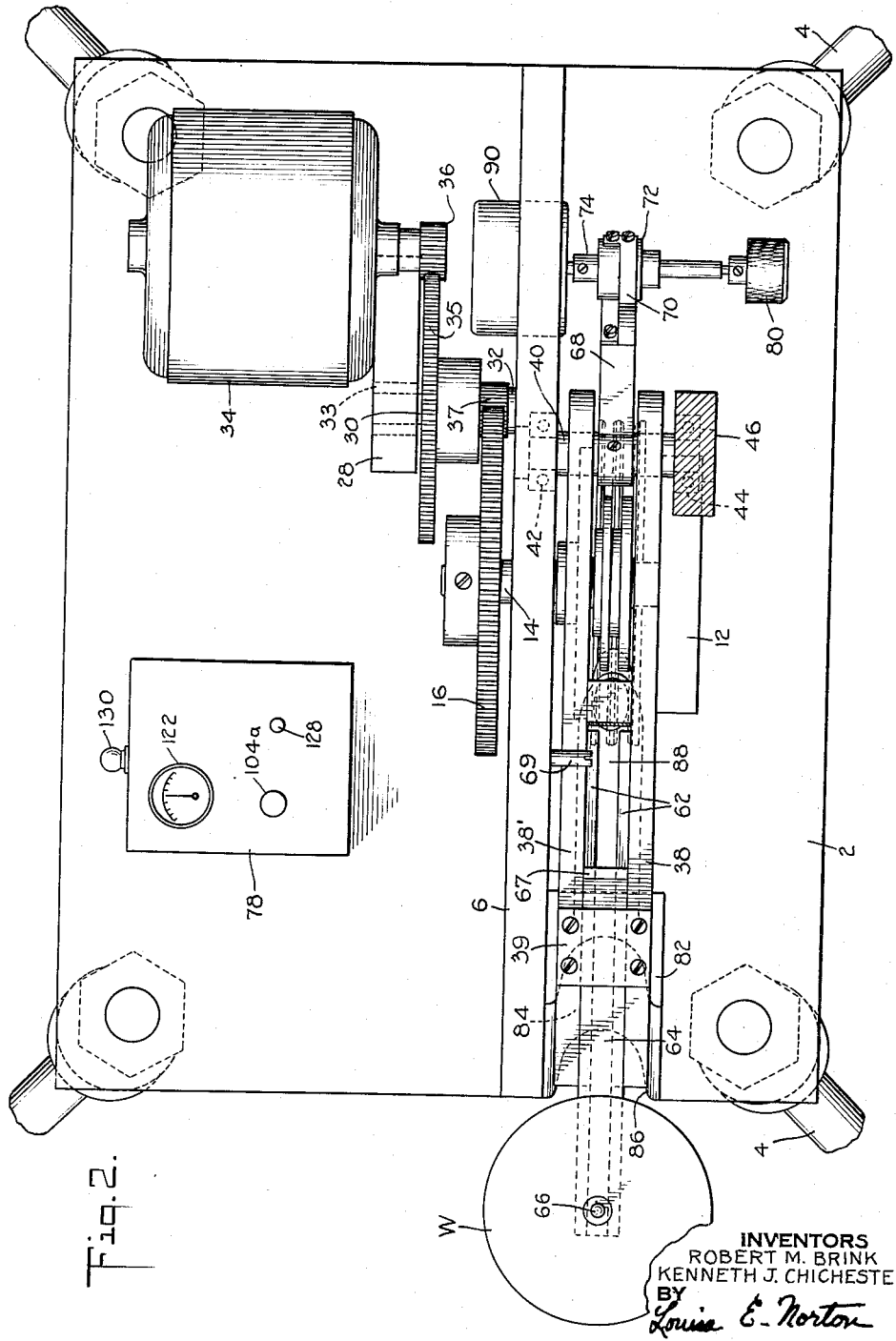

Mounted on the base plate 2 adjacent one side is a block 82 provided with a smooth arcuate guide channel 84 for the textile strands to be analyzed, the base 2 being suitably cut away as indicated at 86 in Fig. 2 to permit sliver or roving to be drawn upwardly from a source of supply (not shown) positioned beneath the base plate. In the drawings a sliver strand to be analyzed is indicated at 87. A guide strip 88, is secured at one end to the block 82 at the strand outlet end and rests at its other end on the driven roll 22 for delivery to the respective groove therein of the sliver or roving to be analyzed. After analysis the textile strand drops by gravity from the idler ring 25 or 27 and may be lead away by known means or collected as desired.

Lint or the like is removed from the disks 56 and 58 by a wiper blade comprising a pad 89 of felt or the like on the end of a spring arm 91 conveniently mounted on the spacer 41.

Reference may now be had to Fig. 7 in which is shown the circuit associated with the new analyzer. In Fig. 7, the selsyn motor is indicated diagrammatically at 90. One coil is connected through a resistor 92 to the secondary of a stepdown transformer 94 the primary of which is connected to power lines $L_1$, $L_2$ through a suitable switch $S_1$ and fuse $f_1$. Lines $L_1$, $L_2$ may be 115 volt 60 cycle lines and the drive motor 34 of the analyzer is connected to these lines through a switch $S_2$ and fuse $f_2$. The output coil of the selsyn motor 90 is connected across the primary of a step-up transformer 96, the secondary of which is connected at its ends to the anodes of a pair of diodes 98 and 100 and the mid-point of which is connected through a resistor 102 to an adjustable tap 104 on a resistor 106. Resistor 106 is connected at one end to the cathode of tube 98 and to a condenser 108 and at its other end to the cathode of tube 100 and to a condenser 110. The other terminals of condensers 108 and 110 are connected to the tap 104, and these condensers 108 and 110 together with the resistance 106 comprise a filter for the output of the diodes 98 and 100.

The rectifiers 98 and 100 although separately indicated in the diagram are, in practice, components of a double diode such as 6H6, the cathode heater for which is indicated at 112 and shown connected across the secondary of transformer 94. Also connected across the secondary of transformer 94 is resistor 102, a condenser 114 being inserted in one lead to the resistor.

The operation of the phase sensitive detector circuit so far described will be readily apparent to those skilled in the art. At the nul position of the selsyn 90, when the voltage across transformer 96 is zero, the total rectified voltage across resistor 106 will be zero. Angular displacement of the selsyn motor shaft produces a voltage across the primary of transformer 96. The voltage across one half of the secondary of transformer 96 will be in phase with the voltage across resistor 102. Conversely, the voltage across the other half of the secondary winding will be 180 degrees out of phase with the voltage across resistor 102. The net A. C. voltage at one of the diode plates will then be greater than at the other, and a D. C. voltage will appear across resistor 106. Rotating the selsyn in the opposite direction from the nul produces a voltage of the opposite phase across the primary of transformer 96. This reverses the phase situation at the diode plates and thereby reverses the polarity of the D. C. voltage across resistor 106. Capacitor 114 corrects the phase error produced by current limiting resistor 92 in series with the inductance of the selsyn primary winding.

A suitable recording device (not shown) may be connected, as by a jack, directly across resistor 106 but preferably, as indicated in the diagram, a filter circuit, including a series connected inductor 116 and parallel connected condenser 118 is provided between the resistor and jack terminals 120. An indicating ammeter 122 which is preferably provided for use in "zeroing" the circuit, is connected in series with resistors 124 and 126 across the terminals 120. Resistor 124 is about the order of one tenth megohm and resistor 126 has a substantially higher resistance, about one megohm, and is provided with a shunting switch 128 for use during fine adjustment for balance.

The various elements of the above described circuit, with the exception of the seysyn motor 90, are mounted in the housing 78 (see Figs. 1 and 3), with the dial of meter 122 set in an opening in a wall thereof and with the operating knob 104a for tap 104 and the shunting switch 128 mounted to be accessible for manipulation by an operator. A signal light 130, connected across the secondary of transformer 94, is also mounted on the casing wall so as to indicate when the power is on.

In the operation of the above described analyzer, if it is desired to indicate and record variations in sliver size, above and below a predetermined value, the meter reading is first brought to zero by adjustment of the angular position of the shaft of the selsyn motor by means of the knob 80 when a sample of sliver of the predetermined size is compressed between the disk 56 and ring 25 in groove 24, tap 104 being also adjusted, if necessary, to insure balance. Rough adjustment for balance is made with switch 128 open and fine adjustment with that switch closed to shunt resistor 126. During these adjustments, the switch S₂ controlling the motor circuit is open so that the sliver sample is not advanced through the device. After adjustment to zero output, the sample of sliver is removed and a sliver strand to be tested is placed on the ring 25 of the driven roll. Switch S₂ is thereupon closed to energize motor 34, which thereupon rotates the driven roll. As the sliver advances through the analyzer, variations in thickness will cause rocking of the lever arm and rotation of the shaft of the selsyn motor with resultant deflection of the meter needle and of the recorder pen, the magnitude of the deflections corresponding with the magnitude of the departure of the sliver size from that of the sample and the direction of the deflection depending upon whether the sliver is thicker or thinner than the sample. If the device is to be used to indicate sliver size rather than size variations, the circuit is adjusted to balance with the idler disk 56 in direct contact with the ring 25. In this case the readings of the meter and recorder will vary in magnitude with the sliver size but the deflections will be unidirectional. When roving, rather than sliver, is to be analyzed, the same procedure is followed, except, of course, the roving is introduced between disk 58 and the ring 27 in groove 26 of the driven roll. Preferably also, a smaller weight W is mounted on the end of the lever arm when roving rather than sliver is being analyzed.

The invention has now been described with reference to one specific embodiment thereof. Obviously various changes could be made in the particular construction illustrated and described without departing from the spirit of the invention or the scope of the appended claims.

The following is claimed:

1. A device for clearing from a grooved roller a traveling strand of material which is adapted to be compressed into an arcuate segment of said groove, comprising a ring carried in said groove and over which said strand passes, said ring having a greater inside diameter than that of said roller at the base of said groove, a radial thickness less than the depth of the groove and conforming to the sides of the groove whereby said strand is lifted away from said groove after traveling beyond said arcuate segment.

2. In a device for measuring the thickness of a strand of textile material wherein said strand is caused to pass between a grooved roller and an idler roller mating with said grooved roller, the combination with said rollers of an idler ring carried in said groove, said ring being of larger inside diameter than said roller at the base of the groove and operative to lift said strand from said groove after passage beneath said idler roller.

References Cited in the file of this patent

UNITED STATES PATENTS

| Number | Name | Date |
| --- | --- | --- |
| 55,331 | Merriam et al. | June 5, 1866 |
| 187,052 | Seybold | Feb. 6, 1877 |
| 191,586 | Hatch | June 5, 1877 |
| 413,925 | Blanchard | Oct. 29, 1889 |
| 549,444 | Dailey | Nov. 5, 1895 |
| 667,665 | Beckh | Feb. 12, 1901 |
| 763,011 | Mietaschk | June 21, 1904 |
| 805,912 | Herzog | Nov. 28, 1905 |
| 1,387,825 | Aldeborgh | Aug. 16, 1921 |
| 1,540,969 | Walen et al. | June 9, 1925 |
| 1,546,890 | Gilson | July 21, 1925 |
| 1,603,808 | Schane | Oct. 19, 1926 |
| 1,868,523 | De Florez | July 26, 1932 |
| 1,903,716 | Kalle | Apr. 11, 1933 |
| 2,143,297 | Bochmann | Jan. 10, 1939 |
| 2,177,398 | Aller | Oct. 24, 1939 |
| 2,181,902 | Lovett | Dec. 5, 1939 |
| 2,267,184 | Bagno | Dec. 23, 1941 |
| 2,321,386 | Holmes, Jr., et al. | June 8, 1943 |
| 2,389,692 | Sherwin | Nov. 27, 1945 |
| 2,392,010 | Stevens | Jan. 1, 1946 |
| 2,434,963 | Schmidt | Jan. 27, 1948 |
| 2,447,131 | McDermott | Aug. 17, 1948 |
| 2,481,613 | Petersen | Sept. 13, 1949 |
| 2,503,851 | Snow | Apr. 11, 1950 |